July 19, 1960

R. C. DU BOIS 2,945,377

DIFFERENTIAL PRESSURE APPARATUS

Filed April 9, 1956

Inventor
Robert C. DuBois
by Robert Cushman & Grover
Att'ys

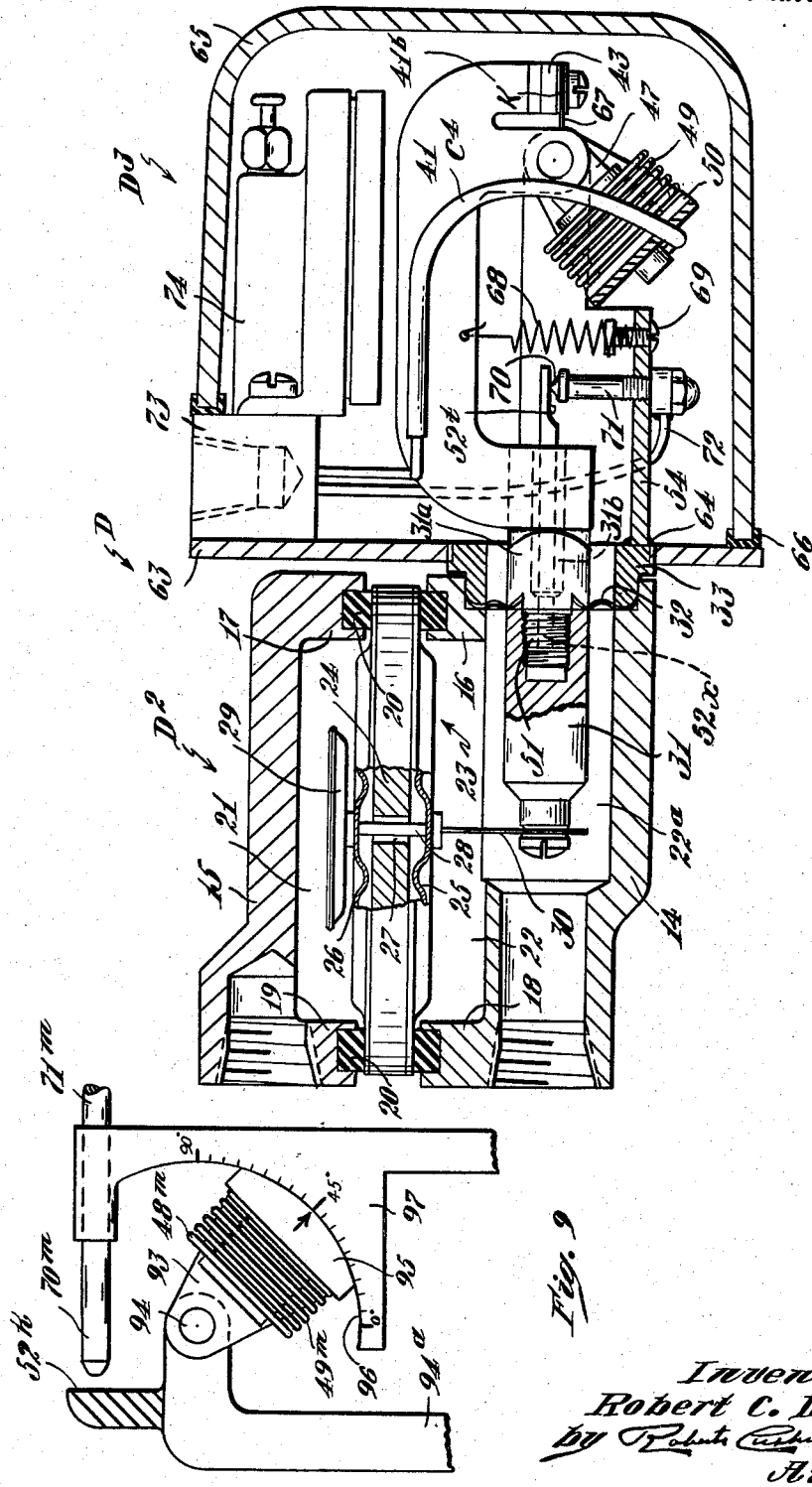

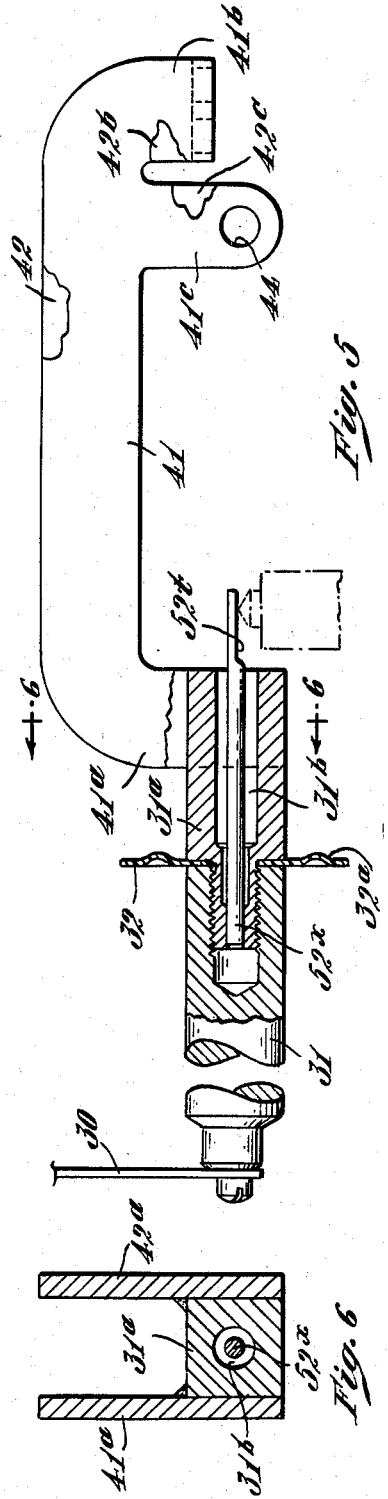
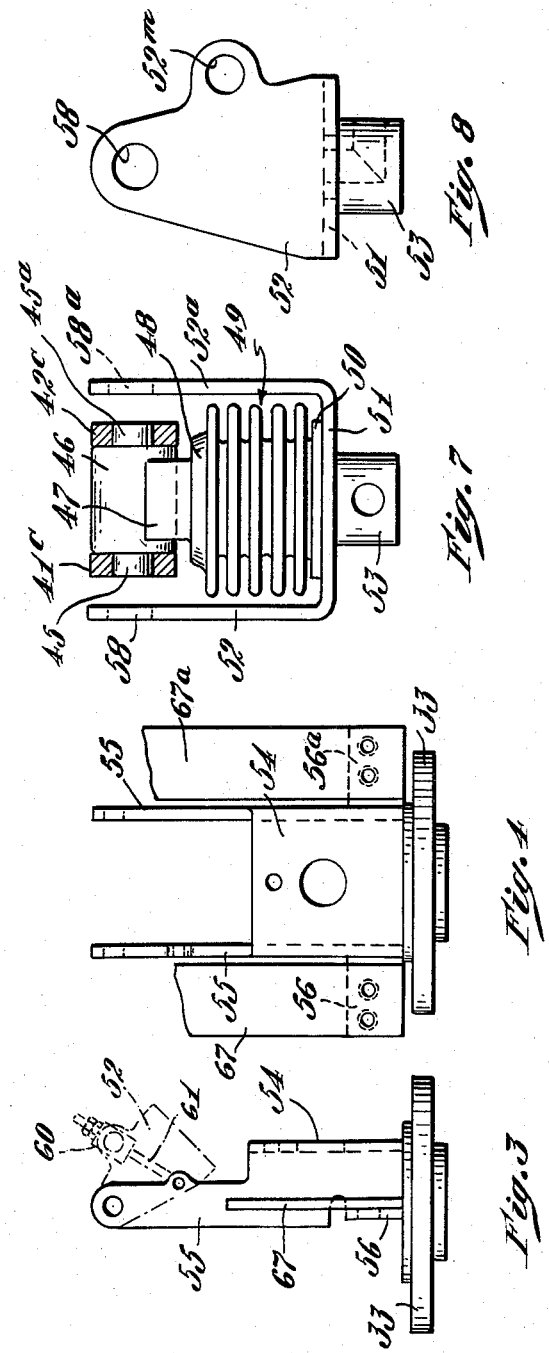

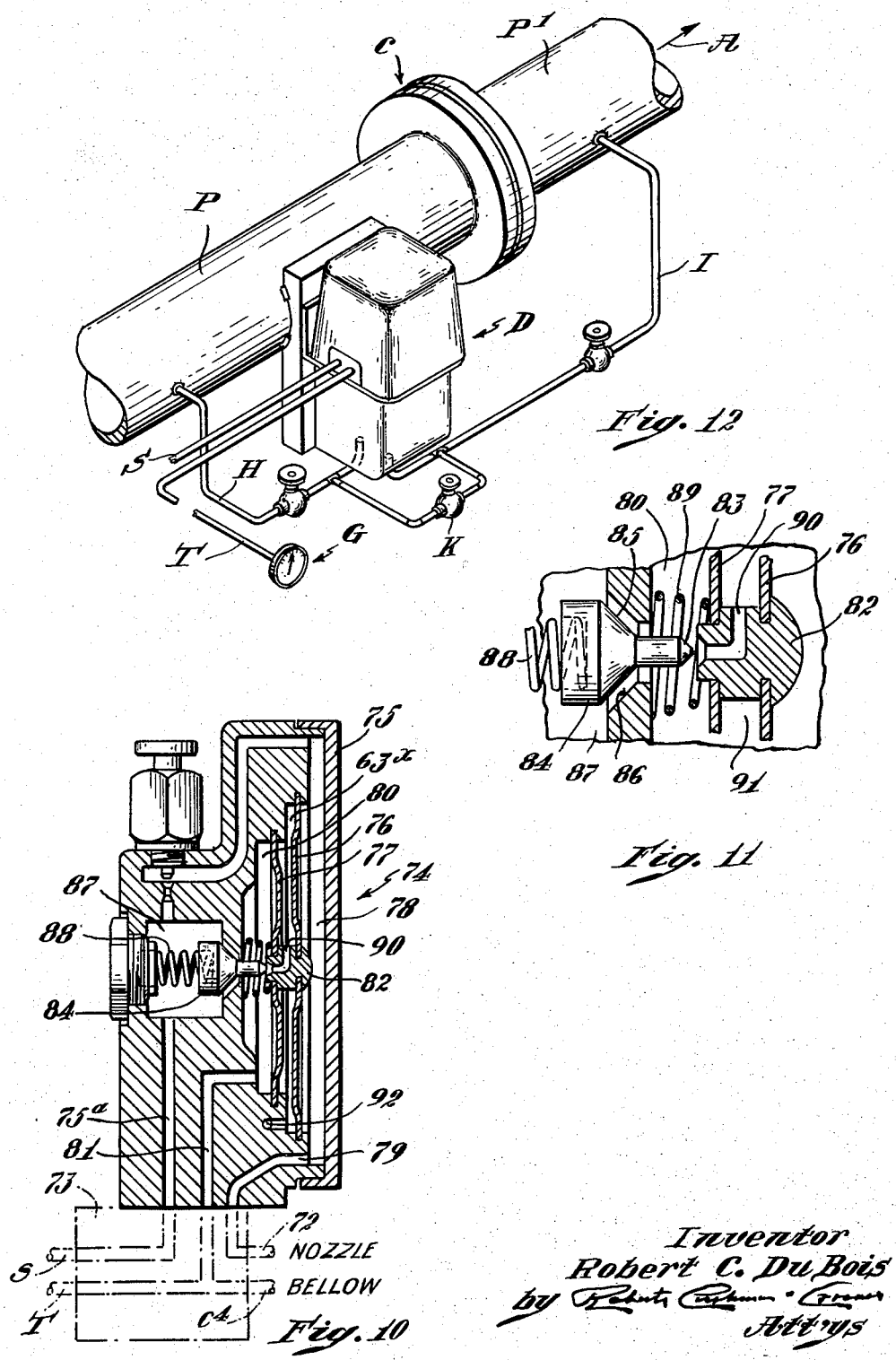

United States Patent Office 2,945,377
Patented July 19, 1960

2,945,377

DIFFERENTIAL PRESSURE APPARATUS

Robert C. DuBois, Fairfield, Conn., assignor to Manning, Maxwell & Moore, Incorporated, Stratford, Conn., a corporation of New Jersey Filed Apr. 9, 1956, Ser. No. 576,946

9 Claims. (Cl. 73—407)

This invention pertains to differential pressure apparatus. While of more general application, so far as its broader aspects are concerned, it is herein illustrated and described, by way of example, with reference to its embodiment in a device here referred to as a "flow meter" for indicating the rate of fluid flow through a pipe or conduit.

A principal object of the invention is to provide simple means readily applicable to a pipe or other conduit through which fluid flows and which, in response to a difference in fluid pressures subsisting at spaced points along the pipe, acts to indicate at some convenient point the true rate of flow through the pipe, if desired, at a point remote from the place at which said different pressures occur. A further object is to provide pressure indicating means wherein the indicating device for instance, a pressure gauge, is designed to respond to fluid pressure which may be transmitted through a tube for a substantial distance, the gauge pressure bearing a definite, predetermined ratio to the existing differential pressure in the pipe or conduit. A further object is to provide pressure indicating means of the above type having provision for adjusting the ratio between the existing pressure differential in the pipe or conduit and the pressure which is transmitted to the indicating means. A further object is to provide a device of the above type of a design such as to minimize errors due to unintended deflection of the operating parts. Other and further objects and advantages of the invention will be pointed out in the following more detailed description and by reference to the accompanying drawings, wherein Fig. 1 is a front elevation, partly in vertical section, illustrating one desirable embodiment of the invention;

Fig. 2 is a horizontal section, with certain parts in elevation, through the device shown in Fig. 1;

Fig. 3 is a plan view of a fixed frame which supports certain of the moving parts of the device;

Fig. 4 is a side view of the frame shown in Fig. 3;

Fig. 5 is a plan view of the rocking beam or lever which carries the flapper valve;

Fig. 6 is a section on the line 6—6 of Fig. 5;

Fig. 7 is a front elevation of the pressure motor of the feed-back device with associated parts;

Fig. 8 is a plan view of the bracket which supports the pressure motor;

Fig. 9 is a fragmentary plan view showing a modified arrangement of the pressure motor device;

Fig. 10 is a fragmentary transverse section illustrating an air relay of a generally conventional type forming an element of the mechanism of the present invention;

Fig. 11 is a fragmentary section in the same plane as Fig. 10, showing certain details of the air relay to larger scale, and Fig. 12 is a diagrammatic perspective view showing the differential pressure apparatus of the present invention as embodied in a flow meter and associated with a pipe line.

Figure 1:
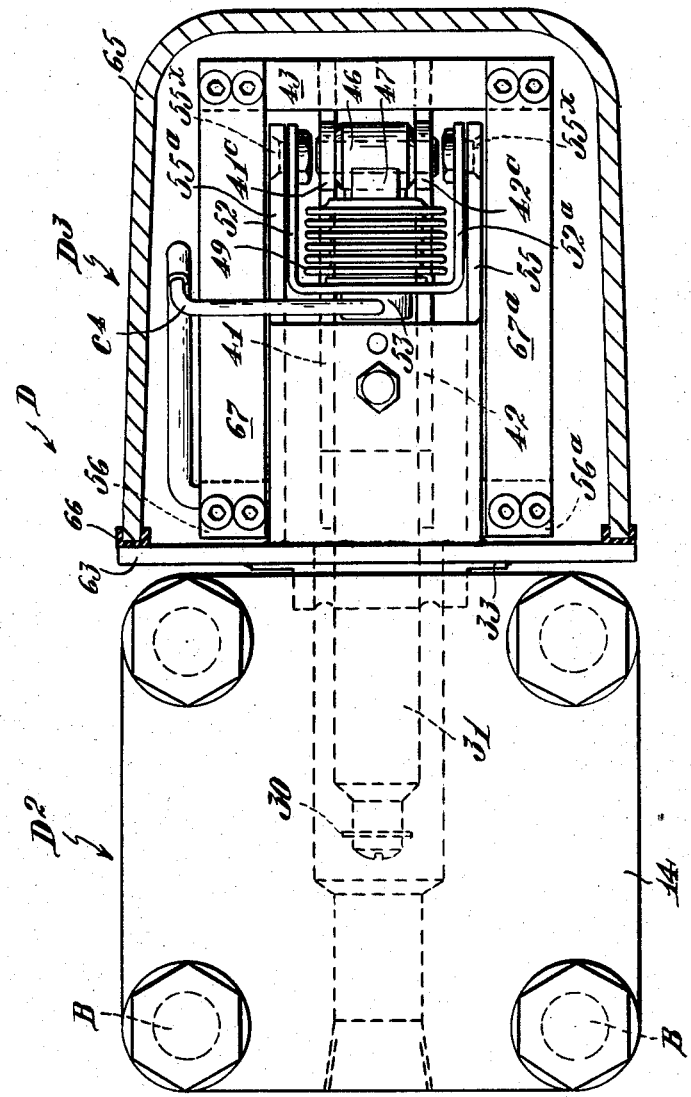

In Fig. 12 of the drawings, the flow measuring apparatus of the present invention is diagrammatically illustrated as applied to a pipe line comprising the sections P and P' which are united by a flange-connection C within which there is arranged a conventional orifice plate (not shown) whose presence results in a measurable difference in pressure in the pipe sections P and P' respectively, it being assumed, for example, that the flow of fluid is in the direction of the arrow A (Fig. 12). As illustrated, the casing of the differential pressure device D is mounted in any suitable manner on the pipe section P and a small pipe H, desirably provided with a valve, is tapped into the pipe section P and leads into the casing of the differential pressure device. Another pipe I, likewise provided with a valve, is tapped into the pipe section P', and also leads into the casing of the pressure-responsive device D. Desirably, the pipes H and I are connected by a pipe having the controlling valve K. A pipe or tube S, leading from a suitable supply of air at constant pressure, enters the casing of the differential pressure device D, and another pipe or tube T extends from said differential pressure apparatus to any desired point, near to or remote from the apparatus D, and terminates at an indicator G, for example, an instrument of the pressure gauge type but graduated to read in terms of rate of flow. It is to be understood that the arrangement illustrated in Fig. 12 is merely by way of example and is not limiting as to the mode of installation of the apparatus of the present invention.

Referring more especially to Figs. 1 and 2, the differential pressure device D is shown as including a casing having a base portion $D^2$ which, by way of example, may comprise front and rear parts 14 and 15, these parts, when assembled, being united by means of bolts B (Fig. 1). The parts 14 and 15 are rigid, usually castings, and (Fig. 2) have flanges 16, 17 and 18, 19 respectively, the flanges of one of said parts being directed toward those of the other part and having grooves in their edges for the reception of packing material 20. It may be noted that the parts 17 and 19 and the parts 16 and 18 will usually be portions of unitary continuous flanges extending about the entire periphery of the respective members 15 and 14. The space between the parts 14 and 15 with their flanges is divided into two independent chambers 21 and 22 by a partition in the form of a pressure-responsive capsule 23.

This capsule 23 may be like that more fully described in my copending application for Letters Patent of the United States, Serial No. 576,962, filed April 9, 1956, now Patent No. 2,879,802, but is here shown (Fig. 2) as comprising a rigid core 24 with flexible diaphragms 25 and 26 arranged at its opposite faces respectively, and with the margins of the diaphragms united leak-tight to the marginal portion of the core, the united margins of the diaphragms and core being clamped leak-tight between the packings 20 of the front and rear parts 14 and 15 of the case. The diaphragms are rigidly united by a part 28 which extends through a passage 27 at the center of the core, the passage and the spaces between the diaphragms and adjacent faces of the core being filled with an incompressible fluid. Optionally, a temperature-compensating auxiliary capsule 29 may be arranged, for example, in the chamber 21 and connected to the liquid filled space of the capsule 23.

The chamber 22 has an extension $22^a$ formed in the part 14 of the case. A resilient motion-transmitting element 30 (Fig. 2) is fixed at one end to the part 28, while its opposite end portion extends into the portion $22^a$ of the chamber 22. This part $22^a$ of the chamber houses the left-hand end portion of a rigid "beam" or lever 31. This beam or lever 31 is supported by a flexible diaphragm 32 through which the beam passes, the inner margin of the diaphragm being fixed leak-tight, for example by solder, to the beam. The outer portion of the diaphragm rests on an annular shoulder formed in the wall of the chamber 22$^a$ and is clamped against the shoulder by a ring 33, which may be soldered or otherwise fixed to the wall of the chamber 22$^a$. As here illustrated by way of example, the diaphragm 32 has a single annular rib 32$^a$ (Fig. 5) intermediate its inner and outer edges, although if the device be of larger dimensions the diaphragm may have more than one such rib. The diaphragm 32 provides a seal for the upper end of the chamber 22$^a$, and at the same time constitutes a fulcrum for the beam or lever 31.

The beam 31 (Fig. 5) comprises a rigid, generally cylindrical member to whose left-hand end (as seen in Figs. 2 and 5) the stiffly resilient transmission element 30 is attached. At its opposite end the member 31 has a screw-threaded socket which receives a screw-threaded nipple at one end of a second rigid member 31$^a$, the inner margin of the diaphragm 32 being clamped between the opposed ends of the parts 31 and 31$^a$. The part 31$^a$ has a longitudinal bore 31$^b$, which extends into said screw-threaded nipple and which is of reduced diameter at its left-hand end (as viewed in Fig. 5), and having fixed in this portion of smaller diameter the left-hand end of a rigid rod 52$^x$ having a flat surface 52$^t$ at its free end portion, which constitutes the flapper valve of the feed-back mechanism hereinafter to be described. It will be obvious that the only contact of the rod 52$^x$ with the part 31$^a$ of the beam is closely adjacent to the fulcrum axis provided by the diaphragm, since the rod 52$^x$ is of an external diameter less than the diameter of the main portion of the bore 31$^b$ in the part 31$^a$. Thus, distortion of the beam as a whole, in response to force applied to its right-hand end, as viewed in Fig. 5, has substantially no effect upon the position of the free end of rod 52$^x$ and thus cannot result in a fortuitous positioning of the flapper valve.

The major portion of the part 31$^a$ which is to the right of the diaphragm 32 (Fig. 5) is of rectangular transverse section (Fig. 6) and to opposite faces of this rectangular portion are welded the forwardly directed legs 41$^a$ and 42$^a$ of parallel elongate plates 41 and 42 (Figs. 1 and 5), which extend toward the right as viewed in Figs. 1 and 5, and which at their right-hand end portions are shaped to provide the forwardly directed fingers 41$^b$, 41$^c$ and 42$^b$, 42$^c$, respectively. The fingers 41$^b$ and 42$^b$ are bent to provide flanges which lie in the same plane and the opposite ends of a rigid bar 43 (Figs. 1 and 2) are fixed to these flanges.

The entire beam or lever thus comprises the rigidly united parts 31, 31$^a$, 41, 42, 43 and the rod 52$^x$, the entire structure being rockable as a lever about a diameter of the diaphragm 32 as an axis.

The forwardly extending fingers 41$^c$ and 42$^c$ have aligned bearing openings 44 (Fig. 5) which receive trunnions 45 and 45$^a$ projecting from opposite ends of a roll 46 (Fig. 7) to whose peripheral surface is welded a block 47 to which one head 48 of a pressure motor 49 of the bellows type is fixed.

The opposite head 50 (Figs. 2 and 7) of the bellows is fixed to the transverse member 51 of a U-shaped frame (Figs. 7 and 8) having parallel legs 52 and 52$^a$. To the outer surface of the transverse member 51 of this frame there is welded a block 53 having an internal passage which communicates at one end with the interior of the bellows and whose other end communicates with a flexible conduit C$^4$ (Figs. 1 and 2) through which pressure fluid may flow into the bellows.

A rigid frame (Figs. 3 and 4) is fixed to the ring 33 above described. This frame as here shown comprises a unitary piece of sheet metal shaped to provide the front wall 54 and the elongate arms 55 and 55$^a$, which are disposed in parallel planes and spaced apart a distance exceeding the spacing of the members 41 and 42 of the beam, so that the beam may be located between the arms 55 and 55$^a$ without contacting the latter. The frame (Figs. 3 and 4) also comprises ears 56 and 56$^a$ located in a plane which is parallel to the front wall 54 but disposed rearwardly of the latter, the left-hand edges (as viewed in Fig. 2) of all of the parts 54, 55, 55$^a$, 56 and 56$^a$ being united by welding to the ring 33.

At their right-hand ends, as viewed in Fig. 1, the arms 55 and 55$^a$ are provided with aligned openings which receive pivot studs 55$^x$ which also pass through aligned openings 58 and 58$^a$ near the free ends of the arms 52 and 52$^a$ of the bellows supporting frame above described. This frame, with the bellows, is thus capable of swinging about the axis defined by these studs 55$^x$. By this means, the bellows may be swung so that the included angle between its longitudinal axis and the longitudinal axis of the aligned parts 31 and 31$^a$ of the beam may be varied. Any suitable means may be provided for holding the bellows supporting frame in adjusted position. One simple means is indicated in broken lines in Fig. 3. As shown in Fig. 8, the side arm 52 of the bellows carrying frame has an opening 52$^m$ which receives a stud forming a pivot for a block 60 having a bore through which passes a rod 61, one end of which is pivoted to the arm 55 of the fixed frame. A nut on the screw threaded end of rod 61 provides for varying the effective length of the rod 61.

The casing of the instrument also comprises the cap portion D$^3$ including a bottom plate 63 which is fixed, for instance by welding at 64, (Fig. 2) to the ring 33. This cap also comprises a hollow cup shaped member or hood 65 whose edge is seated in a channel member 66 carried by the plate 63.

To assist the thin and flexible diaphragm 32 in resisting excessive pressure in the chamber 22$^a$, two elongate, stiffly resilient blades or ribbons 67 and 67$^a$ (Fig. 1) are fixed at their upper ends to the transverse bar 43 of the beam and at their lower ends to the ears 56, 56$^a$ forming parts of the fixed frame. These thin, resilient blades are accurately disposed, for example by the use of shims K (Fig. 2) interposed between their upper ends and the bar 43 so that they lie in the plane of that diameter of the diaphragm 32 about which the beam rocks and in the plane of the longitudinal axis of the fulcrumed portion of the lever device, so that changes in static pressure will not develop a force tending to rock the beam. Since these parts 67 and 67$^a$ are subjected only to tension and a slight amount of bending they may be made very thin and flexible so that they oppose substantially negligible resistance to the rocking motion of the beam.

A tension spring 68 is fixed at one end to that part of the beam comprised by the member 41, the other end of the spring being secured to a screw 69 in a screw-threaded aperture in the front plate 54 of the frame. This spring constantly tends to turn the beam in a clockwise direction as viewed in Fig. 2 and thus urges the flapper valve, constituted by the flat surface 52$^t$ of the rod 52$^x$ into a position such as to close a nozzle 70. This nozzle 70 is at the rear end, as viewed in Fig. 2, of a tubular member 71 which is mounted for longitudinal adjustment in an opening in the front plate 54 of the frame, the interior of the tubular member 71 being always in communication with a flexible conduit 72.

Within the rear portion of the hood 39 the bottom plate 63 carries a block 73 (Fig. 2) on which an air relay 74 is mounted. This air relay may be of any conventional type, but is here shown by way of example (Fig. 10) as comprising a diaphragm housing 75 having therein a passage 75$^a$ to which air is supplied at constant pressure through the pipe S (Fig. 12). Within the diaphragm housing 75 two spaced diaphragms 76 and 77 are arranged, the diaphragm 76, in cooperation with one wall of the housing, defining a chamber 78 having an outlet passage 79 from which the flexible tube 72 leads to the nozzle 70. The chamber 80 between the diaphragm 77 and the opposite wall of the housing 75 has an outlet passage 81 which is connected by the pipe T to the remotely located indicator G. Also, the flexible conduit C⁴ leads from the outlet passage 81 (Fig. 10) to the interior of the bellows 49.

A combination motion-transmitting device and valve 82 (Fig. 11) connects the diaphragms 76 and 77 so that they are compelled to move as a unit, and this device 82, at times, contacts a seat 83 on a movable combined seat and valve member 84, which comprises the valve element 85 which, at times, engages a seat 86 defining a port between the chamber 80 and a space 87 from which the passage 75ª leads. A spring 88 tends normally to hold the valve 85 against the seat 86. A spring 89 tends to move the part 82 away from the part 84. When the part 82 is separated from the seat 83, air may flow from the chamber 80 out through a port 90 in the part 82 and into the space 91 between the diaphragms and thence out through an exhaust port 92 (Fig. 10).

Referring to Fig. 9, there is shown a slight modification wherein the head 48ᵐ of the bellows 49ᵐ is fixed to a support 93 having pintles in parallel upwardly extending arms 94ª (only one of which is shown) forming parts of the beam or lever 31. The other head of the bellows is fixed to a shoe 95 having an outer arcuate face coaxial with the pintles 94. This shoe contacts a concave arcuate surface 96 formed on a part 97 of the fixed frame, the part 97 being graduated in degrees and the shoe 95 having an index element which cooperates with the graduations on the part 97 to indicate the angularity of the axis of the bellows. By sliding the shoe 95 along the surface 96 the angle between the axis of the beam 31 and the axis of the bellows 48ᵐ may be varied, thus varying the effective force which the bellows exerts upon the beam.

In this arrangement, the nozzle 70ᵐ is at the end of tube 71ᵐ carried by the frame, and the flapper valve has the surface 52ᵏ which is disposed opposite to the nozzle, the flapper valve 52ᵏ being carried by the beam 31. Any suitable arrangement, not shown, may be provided for holding the shoe 95 at the desired position of adjustment. The operation of these parts, as shown in Fig. 9, is the same as that of the corresponding parts illustrated in Fig. 2.

The operation of the apparatus is generally as follows, it being assumed that it has been applied to a pipe line as illustrated in Fig. 12, and in such a way that the high pressure pipe H communicates with the chamber 22 (Fig. 2) and the low pressure pipe I communicates with the chamber 21. In such an arrangement as that shown in Fig. 12 the differential pressure which results from the restriction of flow produced by the orifice plate is approximately proportional to the square of the flow and the indicator G will be graduated accordingly to indicate the actual rate of flow. Assuming that pressure in the chamber 22 exceeds that in the chamber 21, the diaphragms 25 and 26 of the capsule 23 will move toward the chamber 21 and thus, through the connecting element 30, will swing the beam 31 in a clockwise direction (Fig. 2), the beam swinging about a diameter of the diaphragm 32 but being restrained against axial movement by the flexible tension blades 67 and 67ª. The clockwise movement of the beam will reduce the slight normal gap between the flapper valve 52ᵗ and the end of the nozzle 70 and this will cause pressure to build up in the chamber 78 (Fig. 11) of the air relay, thus moving the diaphragm 76 to the left (Fig. 11) to open the valve 85 so as to admit pressure fluid from the supply to the bellows 49 and also to the pipe T which leads to the indicator. The increased pressure within the bellows creates a force which tends to rock the beam 31 in a counterclockwise direction, thus moving the flapper valve 52ᵗ away from the nozzle 70 until the parts are restored to their normal spaced position for this particular pressure differential. If the pressure differential should drop, a reverse operation takes place, the flapper valve first moving away from the nozzle and thus permitting air to escape more rapidly than normal from the nozzle. This relieves pressure in the bellows and also in the pipe T, and since the bellows now contracts, the beam is permitted to swing in a direction such as to tend to close the nozzle, thus again restoring the parts to normal condition with the indicator G indicating the lower rate of flow. Obviously, by changing the angular position of the bellows the ratio of the pressure differential to the reading of the indicator may be varied. As here illustrated, the distance from the diaphragm to the point at which rod 52ˣ emerges from the bore in part 31ª is approximately 1/15 of the distance from the diaphragm to the axes of the studs 45 and 45ª at which the force applied by the bellows 49 may be considered to act, so that distortion of the beam 31, as a whole, does not appreciably affect the position of the flapper valve 52ᵗ.

While certain desirable embodiments of the invention have herein been illustrated and described, together with various suggested utilities of the invention, it is to be understood that the invention is broadly inclusive of all such modifications and uses as fall within the scope of the appended claims.

I claim:

1. In differential pressure apparatus of the kind which comprises pressure-sensitive means operative to create a force proportional to the instant difference between two fluid pressures, an air relay which is supplied with air at substantially constant pressure, a delivery nozzle which receives air from the relay, a feed-back motor having a movable part, a flapper valve movable toward or from the nozzle thereby to determine the effective air pressure at any instant for operating the feed-back motor, an elongate, rigid lever device comprising a substantially rectilinear portion, means providing a fulcrum for the lever device at a point intermediate the ends of said rectilinear portion of the latter, the lever device also comprising an elongate, rigid portion fixed to one end of said rectilinear portion and offset from but parallel to the axis of said rectilinear portion, means for transmitting force from the pressure-sensitive means directly to the other end of said rectilinear portion of the lever device, means for transmitting force directly from the movable member of the feed-back motor to the free end of said offset portion of the lever device, in combination, an elongate, rigid, flapper-valve support coaxial with the rectilinear portion of the lever device and which is fixed at one end to the rectilinear part of the lever device at a point adjacent to the fulcrum means but which is otherwise free from contact with any part of the lever device, the free end portion of said flapper-valve support being opposite to the nozzle and of a shape to constitute the flapper valve.

2. Differential pressure apparatus of the kind which includes a pressure-sensitive element which moves in response to an actuating force, a single, rigid, elongate lever device, means providing an axis intermediate the ends of the lever device about which the latter may rock, the lever device comprising an elongate, rigid, cylindrical portion, a stiffly resilient member operative to transmit motion of the pressure-sensitive element directly to that free end of the lever device which is at one side of said axis thereby to rock the lever device about said axis, a pressure-actuated feed-back motor operative to apply force to that free end of the lever device which is at the opposite side of said axis and in opposition to the force which moves said pressure-sensitive element, an air-delivery nozzle which receives air at substantially constant pressure and which is arranged to discharge air in a jet substantially perpendicular to the longitudinal axis of said cylindrical portion of the lever device, and a flapper valve movable toward or from the delivery end of the nozzle and which is thereby operative to determine the air pressure available for actuating the feed-back motor, the nozzle and flapper valve being spaced from the axis about which the lever device rocks, in combination, means operative to move the flapper valve through exactly the same angle as that portion of the lever device which is closely adjacent to the axis about which the latter rocks, regardless of distortion of that part of the lever device which extends from its pivotal axis to the point of application of force by the feed-back motor, the parts being so arranged that the face of the flapper valve which is opposed to the nozzle is always in a plane which contains the axis about which the lever device rocks.

3. Differential pressure apparatus, according to claim 2, wherein tthe major part of the length of that portion of the lever device which extends from its pivotal axis to the point at which the force is applied by the feed-back motor is offset from the axis of said cylindrical portion of the lever device, and a rigid rod, which is coaxil with said cylindrical portion of the lever device, has one end fixed to the lever device adjacent to said pivotal axis, the rod being free from contact with the offset portion of the lever device, the free end portion of the rod being shaped to form the flapper valve.

4. Differential pressure apparatus, according to claim 2, wherein said cylindrical portion of the lever device has therein an elongate socket whose axis is perpendicular to the axis about which the lever device rocks, and a rigid elongate rod has one end fixed in said socket closely adjacent to the axis about which the lever device rocks so that the rod is coaxial with the cylindrical portion of the lever device, said rod being otherwise free from contact with the lever device, the free end portion of said rod being of a shape to constitute the flapper valve.

5. In a differential pressure apparatus of that kind which includes an element which moves in response to an actuating force, a single, rigid, elongate lever device, said lever device comprising an elongate, substantially rectilinear portion, a flexible diaphragm through which said rectilinear portion of the lever device passes and which constitutes the support for said lever device and provides an axis intermediate the ends of the lever device about which the latter may rock, means for transmitting motion from said movable element to said lever at a point located at one side of said diaphragm and which tends to rock the lever device about said axis, an air-delivery nozzle arranged to discharge a jet of air in a direction substantially perpendicular to the axis of said elongate rectilinear portion of the lever device, a flapper valve having a flat face which is opposed to the nozzle, means operative to apply an opposing force to said lever device at a point at the opposite side of the diaphragm and which is further removed from the diaphragm than is the flapper valve, said opposing force tending to restore the lever device to its initial position after having been rocked by the actuating force, in combination, a rigid support for the flapper valve which is fixedly attached to the lever device closely adjacent to said diaphragm, but which is otherwise free from contact with the lever device, said support being operative to keep the flapper valve always in operative relation to the nozzle but to constrain the flapper valve to move through exactly the same arc as does that portion of the lever device which is adjacent to said diaphragm, regardless of any distortion of that portion of the lever device which extends from said axis to the point at which the opposing force is applied, the axis about which the lever rocks being in the plane of that face of the flapper valve which is opposed to the nozzle.

6. In combination in differential pressure apparatus according to claim 5 and wherein the means for supplying opposing force is a bellows, characterized in having movable means supporting the bellows, such that the axis of the bellows may be oriented thereby to vary that component of force exerted by the bellows which is effective to oppose motion of the rigid lever device.

7. In combination in differential pressure apparatus according to claim 5 having means pivotally connecting one head of the bellows directly to the lever device, the bellows being angularly movable about the axis of said pivotal connection as a center, and means constraining the other head of the bellows to move along a predetermined arcuate path of constant radius, and means for holding the bellows in selected position of adjustment.

8. In combination in differential pressure apparatus according to claim 5 and wherein the means for supplying the opposing force is a bellows closed by a head at each end, respectively, characterized in that one head of the bellows has a rigid part which is pivotally connected directly to the lever device, and means, attached to the other head of the bellows, operative to guide said latter head to swing about the axis of said pivotal connection, thereby to orient the axis of the bellows so as to vary that component of force exerted by the bellows which is effective to oppose the motion of the lever device.

9. Differential pressure apparatus according to claim 5 wherein the means for supplying the opposing force is a bellows having spaced heads, characterized in having means pivotally connecting one head of the bellows directly to the rigid lever device, the opposite head of the bellows being provided with a shoe having an arcuate outer surface, a fixed arcuate track along which said shoe slides as the bellows is swung about the pivotal connection of said part with the lever device, and means for fixing the shoe in selected position of adjustment along said track.

References Cited in the file of this patent

UNITED STATES PATENTS

| 1,716,377 | Grant | June 11, 1929 |
| 2,257,905 | Gorrie | Oct. 7, 1941 |
| 2,352,312 | Donaldson | June 27, 1944 |
| 2,431,200 | Rosenberger | Nov. 18, 1947 |
| 2,535,202 | Gregory et al. | Dec. 26, 1950 |
| 2,536,198 | Matner et al. | Jan. 2, 1951 |
| 2,612,908 | Tate et al. | Oct. 7, 1952 |
| 2,632,329 | Zuehlke | Mar. 24, 1953 |
| 2,652,813 | Reuter et al. | Sept. 22, 1953 |
| 2,672,151 | Newbold | Mar. 16, 1954 |
| 2,711,654 | Baker | June 28, 1955 |
| 2,746,296 | Stover | May 22, 1956 |
| 2,770,246 | Shafer et al. | Nov. 13, 1956 |
| 2,770,258 | Bowdich | Nov. 13, 1956 |
| 2,781,665 | Li | Feb. 19, 1957 |
| 2,789,543 | Popowsky | Apr. 23, 1957 |

FOREIGN PATENTS

| 900,424 | France | Oct. 1944 |
| 562,645 | Great Britain | July 11, 1944 |

OTHER REFERENCES

Germany, Appl. Ser. A20,355, Dec. 15, 1955.